3,399,967
METHOD FOR PRODUCTION OF DEUTERATED METHANES AND HEAVY WATER
Louis A. Pogorski, Toronto, Ontario, Canada, assignor to The British American Oil Company Limited, Toronto, Ontario, Canada, a company
No Drawing. Filed Dec. 13, 1963, Ser. No. 330,246
19 Claims. (Cl. 23—204)

ABSTRACT OF THE DISCLOSURE

A method for recovering deuterated methane from a mixture of methane and deuterated methanes comprising increasing the separation factor of the mixture by subjecting the mixture to a high pressure and a low temperature to provide a mixture having a vapour phase richer in deuterated methanes than methane, fractionating the mixture and recovering the fraction enriched in deuterated methanes.

---

This invention relates to a method for recovering deuterated methanes from methane present in natural or artificial gas mixtures, for example, natural gas, producer gas, coke oven gas and industrial off gases.

More particularly, this invention relates to a method for the production of heavy water recovered by concentration of deuterated methanes normally present in ordinary methane, oxidation of the deuterated methanes enriched product to produce a mixture of hydrogen oxides, deuterium oxides and carbon oxides, followed by the step of separating the heavy water from the condensate of the mixture by known methods, for example, distillation or electrolysis.

Heavy water or "deuterium oxide" is a compound of oxygen and the isotope of hydrogen, that is heavy hydrogen or "deuterium." The most important property of heavy water from the industrial point of view is its capacity to moderate or slow down the neutrons emitted during a nuclear fission combined with a low neutron absorbtivity. The moderating power of heavy water is much higher than that of other known moderators; for example, approximately 30 times higher than that of graphite, 35 times higher than that of beryllium and approximately 81 times higher than that of natural water. In a given reactor, therefore, by employing heavy water as the moderator, more power can be generated than is possible with other moderators.

The principal known use for heavy water is as moderator coolant for certain types of atomic reactors in which it is used as approximately 99.8% concentrate. It is estimated that the heavy water inventory required by heavy water type nuclear power plants is approximately 1 ton of 99.8% heavy water per 1 megawatt (mw.) capacity with about 76% of the heavy water used as moderator, and about 24% if used in the reactor cooling system.

The isotope of hydrogen that is known as "heavy hydrogen" or "deuterium" is present in ordinary hydrogen and its compounds in concentrations of approximately 1 mol of heavy hydrogen per 7,000 mols (143 p.p.m.) of free or bound hydrogen. Heavy water is therefore present in small quantities in natural water.

The problems of heavy water production are due to the low concentration and the poor separation characteristics of deuterium or its compounds. The combination of these factors makes the separation difficult and costly as large quantities of raw materials must be processed at high reflux ratios to obtain a relatively small quantity of the product. Moreover, the equipment is bulky and expensive and the energy consumption is high.

Although many processes for the production of heavy water have been suggested the only practical method of large scale production of heavy water has so far been limited to concentration of deuterium oxides present in natural water by either dual temperature chemical exchange, distillation, electrolysis or a combination of those methods.

In the production of liquid hydrogen by way of low temperature distillation, heavy water may be obtained as a by product at low cost; but this method is limited to small quantities of heavy water because of the limited capacity of present and projected liquid hydrogen plants.

It is therefore the principal object of this invention to provide a method for efficiently and economically recovering deuterated methanes from natural gas, artificial gas mixtures, coke oven gas, producer gas and industrial off gases which contain methane.

It is also a principal object of this invention to provide a method for producing heavy water efficiently and economically and in unlimited quantities derived from the recovery of deuterated methanes from gases containing methane, particularly natural gas.

The principal feature of this invention consists of concentrating deuterated methanes present in gas mixtures containing methane, preferably natural gas, by the liquifaction and low temperature fractionation of such gas mixtures under conditions resulting in an increased separation factor between the deuterated methanes and ordinary methane as compared with its value at approximately atmospheric pressure; and enhancing the separation factor by proper adjustment of the operating conditions such as the temperature and pressure.

Another feature of this invention consists of introducing into such system additives which modify the intermolecular forces of the system and increase the normal separation factor and thereby increase the yield of deuterated methanes from the system.

Still another feature of this invention consists of inducing polarization or selectively introducing energy into the system to modify the intermolecular forces of the system by electric or magnetic forces and thereby increase its normal separation factor.

It is still another feature of this invention to treat gas mixtures containing deuterated methanes and methane under conditions of temperature and pressure substantially similar to those under which the mixtures exist in the natural or artificial stage to preferentially adsorb the less volatile components.

Still another feature of this invention consists of treating natural or artificial gas mixtures containing methane and deuterated methanes under the conditions of temperature and/or pressure substantially lower than those under which the mixture exists in the natural or artificial state and to preferentially adsorb the less volatile components.

Still another feature of this invention resides in producing heavy water by the oxidation of a concentrate containing deuterated methanes to produce a mixture mainly composed of deuterium oxides, hydrogen oxides and carbon oxides followed by the step of final concentration of heavy water either by distillation or electrolysis of the condensed phase.

Methane is present in natural abundance in natural gas and in artificial gas mixtures such as coke oven gas, producer gas, refinery off gas. Methane in such gases is in general a mixture of ordinary methane and methane isotopes. The mono-, two-, three- and four-substituted deuterated methanes are usually referred to as methane-d ($CH_3D$), methane-$d_2$ ($CH_2D_2$), methane-$d_3$ ($CHD_3$), and methane-$d_4$ ($CD_4$). Investigations indicate that the ratio of approximately one part of deuterium per seven thousand parts of ordinary hydrogen is maintained through all the hydrogen compounds existing under normal conditions including deuterated methanes. Thus, the deuterium content of ordinary methane would be approximately 572 parts per million if expressed as methane-d, 286 parts per million as methane-$d_2$, 221 parts per million as methane-$d_3$, and 143 parts per million as methane-$d_4$.

In gas mixtures containing methane, ordinary methane ($CH_4$) and the four deuterated methanes exist in equilibrium as defined by the temperature, pressure and composition of the systems. On the basis of theoretical considerations, it may be assumed that at low concentrations of the deuterated species, most of the deuterium is present in the form of mono-deuterated methane (methane-d). It cannot be excluded, however, that at higher concentrations an increasing amount of deuterium may be present in the form of higher deuterated methanes.

The ease and economics of separation of the deuterated methanes from the ordinary methane will be in general proportional to the differences in their respective molecular structures. Since the mono-substituted methane-d is more similar to the ordinary methane than are methane-$d_2$, methane-$d_3$ and methane-$d_4$ it is to be expected that in general it will be more difficult to separate methane-d from the ordinary methane than the higher substituted deuterated methanes. It therefore follows that any method applicable for efficient and economic separation of methane-d from ordinary methane will be in general even more satisfactory for the separation of higher substituted deuterated methanes from ordinary methane. The ease of separation of the isotopic species is normally expressed in terms of their respective separation factors. In the case of physico-chemical separation considered in this invention, the separation factors are related to the relative volatility and therefore to absolute pressures of the components in question. The greater the difference between the absolute vapor pressures of the two isotopic species at a given temperature, the higher is in general the separation factor and the lower the cost of separation of one component from the other.

The calculation of the vapour pressure ratios of isotopic liquids is difficult because there is no really adequate theory of the liquid state. In general, the differences in the vapour pressures of isotopic substances may be attributed to the quantum effect. Although the existing theories permit the calculation of vapour pressure ratios of some simple isotopes with reasonable accuracy, they are not adequate to predict the vapour pressure ratios of a great number of polyatomic isotopes over the entire range of applicable temperatures and pressures. Many anomalies have been noted. It is an observed fact that many isotopic substances can be separated by distillation more easily than one might expect from the theory. In some cases, the normal behaviour is due to association or dissociation so that the chemical form in the liquid phase is not the same as it is in the vapour phase. This occurs, for example, in the distillation of boron trifluoride etherate, nitrogen peroxide, etc. The separation then occurs as a result of a chemical exchange effect.

It has been recognized that the isotopic substances can be classified into three distinct groups in respect to the relationship of their vapour pressure differential to temperature.

(1) Isotopes showing normal behaviour

Simple monoatomic substances exhibit a difference in vapour pressures which falls off in inverse proportion to the square of the absolute temperature. The lighter isotope remains the more volatile at all temperatures.

(2) Isotopes showing abnormal behaviour

In the case of certain diatomic and polyatomic substances, the lighter substance is not necessarily the more volatile, but the difference in vapour pressures still falls off in inverse proportion to the square of the obsolute temperature.

(3) Isotopes showing exceptionally abnormal behaviour

In the case of diatomic and polyatomic substances which are strongly polarizable, the effects of internal vibrations in the individual molecules may lead to a situation where at high temperatures the heavy isotopic species are the more volatile. The vapour pressure difference is no longer inversely proportional to the square of the absolute temperature.

I have discovered that the vapour pressure difference between the deuterated methanes and ordinary methane increases with pressure within the temperature range −240° F. to −117° F. and the pressure range of 30 p.s.i.a. to 660 p.s.i.a. in a manner unpredictable by any presently known theory.

In investigating experimentally the separation factors between methane-d and ordinary methane over the pressure region from 15 p.s.i.a. to 660 p.s.i.a. I have observed that the vapour pressure difference between methane-d and ordinary methane increases with pressure. The vapour pressure differences observed in experimentation with methane-d and methane are listed in Table I as a function of temperature.

TABLE I.—OBSERVED DIFFERENCE BETWEEN THE VAPOUR PRESSURES OF METHANE-d AND ORDINARY METHANE AS A FUNCTION OF TEMPERATURE

| Temp., °F | Vapour pressure $CH_3D$ (p.s.i.a.) | $P_{CH_3D} - P_{CH_4}$ p.s.i.a. | $P_{CH_3D}/P_{CH_4}$ |
|---|---|---|---|
| −217.5 | 102 | 19 | 1.23 |
| −211 | 116 | 20 | 1.21 |
| −200 | 157 | 23 | 1.17 |
| −196 | 174 | 25 | 1.16 |
| −182.5 | 223 | 26 | 1.13 |
| −180 | 241 | 28 | 1.13 |
| −176 | 262 | 29 | 1.13 |
| −170.5 | 284 | 30 | 1.12 |
| −157 | 336 | 32 | 1.10 |
| −143 | 462 | 31 | 1.07 |
| −133 | 535 | 26 | 1.05 |
| −126.5 | 566 | 25 | 1.05 |

Although the observed differences in the said vapour pressures decrease in the range of about 535 p.s.i.a., I believe that this resulted from the insufficient supply of liquid in the equilibrium cell causing the disappearance of the liquid phase. I believe that the original trend indicating an increase in the vapour pressure difference as the function of pressure continues up to about the critical point of ordinary methane.

I have further discovered that the vapour pressure differences between the deuterated methanes and ordinary methane at above atmospheric pressures are sufficiently high to permit large scale economic and efficient separation of these components by physicochemical methods such as low temperature distillation or adsorption from natural or artificial gas mixtures containing methane and an efficient and economical production of heavy water from such raw materials.

It will be obvious that prior to liquefaction and low temperature distillation of the methane feed it will be necessary to purify the methane feed by any of the known methods to remove all of the impurities which can solidify under the operating conditions. Such impurities may include water, $H_2S$, $CO_2$ and the higher hydrocarbons.

The reported differences in the volatility of ordinary methane and deuterated methanes can be used for separation of the components by an adsorption process in which the less volatile components are separated in a fixed bed or moving bed filled with solid adsorbent. The continuity of operations is accomplished by periodical desorption of the adsorbent by pressure swing or stripping.

For the reasons already pointed out separation by either of the methods previously described will accomplish not only a separation of methane-d from ordinary methane but also of all deuterated methanes from ordinary methane as the higher deuterated methanes will come out with the fraction made up of deuterated methane.

The observed abnormal vapour pressure differences between ordinary and deuterated methanes indicate the presence of unusual intermolecular relationships within the systems. Such intermolecular relationships can undoubtedly be modified and enhanced by suitable additives or application of external forces or energy.

The production of heavy water from the deuterated methane concentrate can be accomplished by oxidizing the concentrate by air or oxygen to form a mixture of deuterium oxides, hydrogen oxides and carbon oxides and the recovery of heavy water from the mixture by any of the known methods such as by distillation or electrolysis.

It is to be understood that the preferred embodiments of the invention have been described and that variations and/or modifications may be made by those persons skilled in the art without departing from the spirit and scope of the invention as defined in the following claims.

What I claim as my invention is:

1. A method for recovering deuterated methane from a mixture of methane and deuterated methanes comprising increasing the separation factor of the mixture by subjecting the mixture to a high pressure and a low temperature to provide a mixture having a vapour phase richer in deuterated methanes than methane, fractionating the mixture and recovering the fraction enriched in deuterated methanes.

2. The method of claim 1 wherein the mixture is subjected to a pressure of 30 to 660 p.s.i.a.

3. The method of claim 1 wherein the mixture is subjected to a temperature of −240° to −117° F.

4. The method of claim 1 wherein the mixture containing methane and deuterated methanes is selected from the group consisting of natural gas, coke oven gas, producer gas and industrial off gas.

5. A method for the production of heavy water from feed gas mixtures containing a mixture of ordinary methane and deuterated methanes, comprising increasing the separation factor of the mixture by subjecting the mixture to a high pressure and a low temperature to provide a mixture having a vapour phase richer in deuterated methanes than methane, fractionating mixture, recovering the fraction enriched in deuterated methanes, oxidizing the fraction enriched in deuterated methanes by chemical reaction with air or oxygen to form a mixture of deuterium oxides, hydrogen oxides and carbon oxides.

6. The method of claim 5 wherein the feed gas mixture is purified prior to liquefaction to remove components which have a tendency to solidify at the operating temperature.

7. The method of claim 5 wherein the mixture of deuterium oxides, hydrogen oxides and carbon oxides produced by oxidizing the fraction enriched in deuterated methanes is cooled and liquefied, such cooled and liquefied mixture being then degassed and the heavy water concentrated to the desired degree by distillation or electorlysis.

8. The method of claim 5 wherein the feed gas mixture is selected from the group consisting of natural gas, coke oven gas, producer gas and industrial off gas.

9. The method of claim 5 wherein the feed gas mixture consists essentially of liquid methane.

10. The method of claim 5 wherein the mixture is subjected to a pressure of 30 to 660 p.s.i.a.

11. The method of claim 5 wherein the mixture is subjected to a temperature of −240° to −117° F.

12. The method of claim 5 wherein the fractionation is carried out in a distillation system made up of a plurality of stages connected to form a cascade, each stage performing a function to concentrate the mixture to a desired intermediate level.

13. The method of claim 12 wherein each stage is operated over a limited desired temperature drop in the range 10 to 100 p.s.i.a.

14. The method of claim 12 wherein the first stage used for initial concentration of the mixture is operated at not more than 600 p.s.i.a. and each succeeding stage at a lower pressure.

15. The method of claim 12 wherein the first stage used for initial concentration of the mixture is operated at not less than 50 p.s.i.a., and each succeeding stage at a higher pressure.

16. The method of claim 12 wherein each stage is made up of several distillation columns connected in parallel in respect of the main feed flow and operating at approximately the same pressures.

17. The method of claim 12 wherein each stage is made up of several distillation columns connected in parallel with respect to the main feed flow, each operating at a lower pressure than the succeeding one.

18. The method of claim 12 wherein a part of the energy required for cooling and liquefaction of the mixture is gained by expansion of the mixture from the line pressure to the operating pressure.

19. The method of claim 12 wherein the energy generated in oxidizing the fraction enriched in deuterated methanes is recovered by heat transfer media.

References Cited

UNITED STATES PATENTS

| | | | |
|---|---|---|---|
| 2,541,569 | 2/1951 | Born et al. | 62—23 |
| 2,583,090 | 1/1952 | Cost | 62—27 |
| 2,780,526 | 2/1957 | Fleck | 23—210 |
| 3,126,267 | 3/1964 | Arend | 62—27 |

OSCAR R. VERTIZ, *Primary Examiner.*

H. S. MILLER, *Assistant Examiner.*